US006694127B2

(12) United States Patent
Yona et al.

(10) Patent No.: US 6,694,127 B2
(45) Date of Patent: Feb. 17, 2004

(54) METHOD AND APPARATUS FOR PERFORMING ON-GOING GAIN CALIBRATING IN A COMMUNICATION SYSTEM

(75) Inventors: Eli Yona, Binyamina (IL); Haim Weissman, Haifa (IL)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 10/117,421

(22) Filed: Apr. 4, 2002

(65) Prior Publication Data

US 2002/0160718 A1 Oct. 31, 2002

Related U.S. Application Data

(60) Provisional application No. 60/281,799, filed on Apr. 5, 2001.

(51) Int. Cl.[7] .............................................. H04B 17/00
(52) U.S. Cl. .................................................... 455/67.11
(58) Field of Search ................................ 455/67.1, 522, 455/555, 523; 375/296; 370/328, 329; 340/501, 506

(56) References Cited

U.S. PATENT DOCUMENTS

| | | | | |
|---|---|---|---|---|
| 5,754,943 A | * | 5/1998 | Arai et al. | 455/14 |
| 5,867,763 A | | 2/1999 | Dean et al. | 455/5.1 |
| 5,898,337 A | * | 4/1999 | Inahasi | 330/134 |
| 5,930,726 A | * | 7/1999 | Fujita | 455/555 |
| 6,229,855 B1 | * | 5/2001 | Takatori et al. | 375/296 |
| 6,342,777 B1 | * | 1/2002 | Takahashi | 370/315 |

FOREIGN PATENT DOCUMENTS

| | | | |
|---|---|---|---|
| EP | 0674452 | 9/1995 | ............ H04Q/7/22 |
| EP | 0756392 | 1/1997 | ............ H04B/7/15 |

OTHER PUBLICATIONS

Burke, et al., "Cellular Coverage in Buildings/Tunnels", Proceedings of the National Communications Forum, Oct. 1989, pps. 892–900.

* cited by examiner

Primary Examiner—William Trost
Assistant Examiner—Danh C Le
(74) Attorney, Agent, or Firm—Philip Wadsworth; Charles Brown; Bruce W. Greenhaus

(57) ABSTRACT

A method and apparatus for performing on-going calibration of a communication system in which a master system unit is coupled to one or more remote units via a relatively long wireline. On the forward link, measurements are made of at the input to the master system unit and the output of each remote unit. On the reverse link, the input to the remote unit is and the output from the master unit is measured when there is a dominant signal applied to one of the remote units. These measurements are made for a controlled signal during an initialization process and during normal operation. A reference gain for the system is determined from the measurements made during initialization. The gain of the system during normal operation is then dynamically compared to the reference gain of the system. A control signal is generated based on the difference between the reference gain and the current gain under normal operation. The control signal is used to adjust the current gain to maintain a gain value that is within a predetermined range of the reference gain.

10 Claims, 4 Drawing Sheets

METHOD AND APPARATUS FOR PERFORMING ON-GOING GAIN CALIBRATING IN A COMMUNICATION SYSTEM

RELATED APPLICATIONS

This application claims priority to U.S. Provisional Application No. 60/281,799, filed on Apr. 5, 2001.

BACKGROUND OF THE INVENTION

1. Field of the Invention

The current invention relates to communications. More specifically, the present invention relates to a method and apparatus for automatically adjusting the amount of gain or loss in a communication system in which signals are relayed between a master system unit and a remote unit.

2. Description of the Related Art

Modem communications systems are an important part of our society today. One such communications system is a wireless cellular communication system. In wireless cellular communication systems, communications between users are conducted through one or more base stations. The term forward link is used to refer to communications from a base station to a subscriber station, and the term reverse link is used to refer to communications from a subscriber station to a base station. A subscriber station is the device that is used by an individual who subscribes to a communication provider for communication services. For example, a person who uses a conventional cellular telephone is a subscriber to the cellular telephone services provided by a cellular telephone service provider, such as Leap Wireless International Inc.

By transmitting information on a reverse link to a base station, a subscriber may communicate with people at other locations through any one of a number of communications systems, including conventional telephones, cellular telephones, or the Internet. The base station receives the information (voice or data) from the first subscriber station and routes the information to a Base Station Controller (BSC). The base station controller routes the information to a Mobile Switching Controller (MSC). The base station serving the subscriber stations sends the information back to the subscriber on the forward link.

As a subscriber station moves about a wireless cellular communication system, the quality of the forward and reverse links (and the capacity of the forward and reverse links to transmit data) will vary. In particular, a user of a subscriber station may move inside a building or enter an area in which signals are blocked, such as a tunnel or valley. When the user does so, the subscriber station may not be able to operate due to the low energy level in the signal that is available to and from the subscriber station.

One solution to this problem is to establish a relay station that can receive signals from a base station and relay (i.e., retransmit) those signals to the user's subscriber station. However, in complex structures, such as buildings having several floors and corridors, a simple relay station is not effective. Accordingly, another approach is to place a master system unit at a location from which signals to and from a base station can be transmitted and received, respectively. Signals are then communicated over a wireline to a remote unit. The remote unit transmits information received from the base station via the master system unit to subscriber stations within an area into which signals transmitted directly from the base cannot easily be received. Likewise, the remote unit receives information from subscriber stations within the area. The remote unit then communicates the information received from the subscriber stations over wirelines to the master system station. The master system station communicates the information over the air to the base station.

One significant problem with such a configuration of master system units and remote units is that power control is an issue. That is, the amount of power that is transmitted to and from a base station must be controlled in order to ensure that system parameters are not violated. For example, there may be limits imposed by a governmental agency (such as the Federal Communications Commission in the United States) on the maximum amount of power that can be transmitted. Such limits may be inadvertently violated by a system that employs a master system unit and remote unit if the gain/loss between the master system unit and the remote unit changes due to temperature variations, aging effects, etc. For example, if the remote unit is transmitting at close to the maximum allowed power output level and the amount of loss in the system decreases (or alternatively the amount of gain increases), then the system may inadvertently exceed the maximum allowed power output level.

Further complicating this problem is the fact that in some systems, power is dynamically controlled to ensure that power is transmitted to the subscriber station at the most desirable level. Accordingly, when the amount of power that is received by the subscriber station is lower than desired, the subscriber station requests more power from the base station from which the signal originated. Likewise, if the amount of power received by the subscriber station is more than needed (or more than desired for any reason), then the subscriber station requests the base station to reduce the amount of power. It is essential to the proper operation of the system that the base station responds to such requests. It is essential for the response to be detected by the subscriber station (i.e., that the power be either increased or decreased as requested). Otherwise, the subscriber station will continue to request a change in the power transmitted by the base station until the base station output power is either maximized in the case of requests to increase power, or minimized in the case of requests to decrease power.

Accordingly, there is a need for a system that allows a master system unit and remote unit to be used in a manner that ensures that the power can be controlled in a desirable way.

SUMMARY OF THE INVENTION

A method and apparatus for compensating for loss or gain variations in signals transmitted between a remote unit and a master system unit of a communications system is disclosed.

In accordance with the disclosed method and apparatus, the amount of power in signals received by the master system unit is measured. The amount of power that is transmitted from the remote unit is also measured. The difference between the two measurements is calculated. This difference is then used to determine the amount of loss or gain between the signal that is received by the master system unit and the signal that is transmitted from the remote unit. Preferably, the measurements are made using a filter, such as an infinite impulse response (IIR) filter. However, it should understood that the "filter" might be any method for getting an average value over time. Furthermore, in an alternative and less desirable embodiment, the values measured may be instantaneous values.

The use of such a filter prevents instantaneous differences that are not indicative of the average gain/loss of the signal being received from having too great an effect on the measurements. In addition, in some embodiments of the disclosed method and apparatus, the time at which measurements are made at the input to the master system unit is correlated with the time at which measurements are made at the output from the remote unit to ensure that the calculated difference between the input to the master system unit and the output from the remote unit are properly computed. By correlating the signals in this manner, differences in the power levels over time and the delay between the time a change occurs at the input to the master unit and the time the change is seen at the output from the remote unit can be taken into account.

The gain or loss is then monitored in order to provide a dynamic means by which to determine the relative amount of additional gain or loss that is needed in order to maintain calibration on the system (i.e., maintain a constant loss/gain between the signal received by the master system unit and the signal transmitted by the remote unit).

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
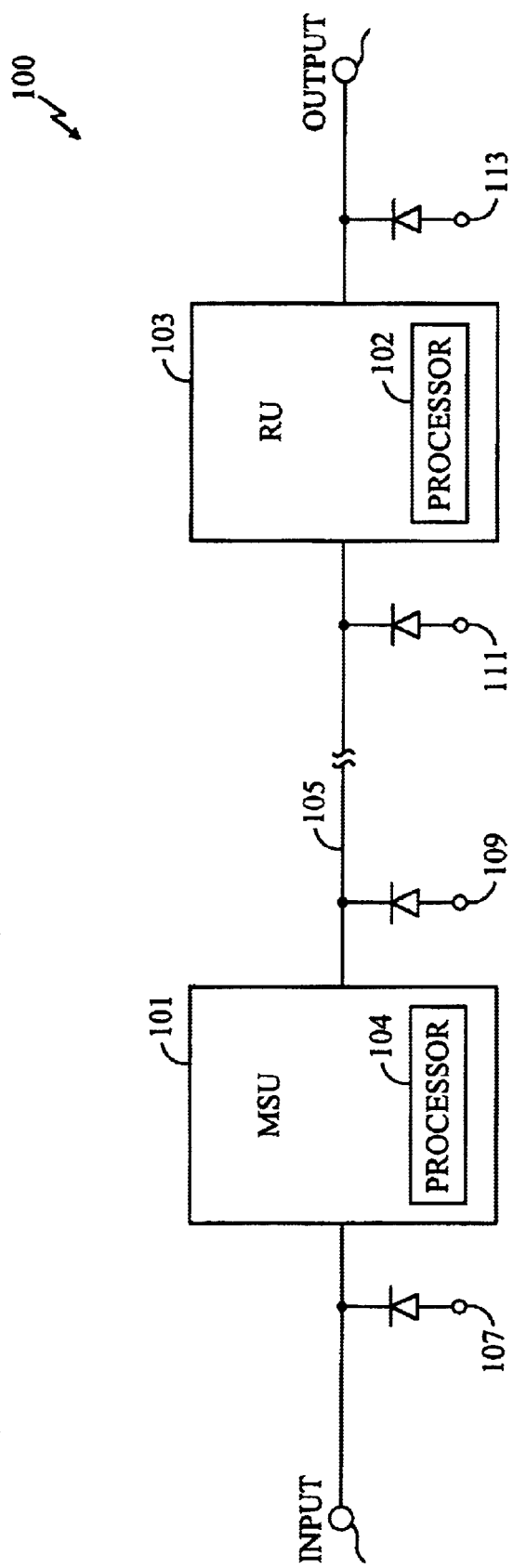
FIG. 1 is a diagram of the forward link of a system in accordance with the disclosed method and apparatus for providing auto-calibration of a communications system that includes an MSU and an RU.

FIG. 1 is a diagram of the forward link of a system 100 in accordance with the disclosed method and apparatus for providing auto-calibration of a communications system that includes a master system unit (MSU) 101 and a remote unit (RU) 103. The MSU 101 receives signals from a transmitting radio station, such as a base station of a cellular communication system. The base station presumably transmits signals that cannot be received satisfactorily at the intended receiving device, such as a mobile station of a cellular communication system. Accordingly, signals received by the MSU 101 are relayed from the MSU 101 to the RU 103 over a wire line 105. In some instances, the wire line may be relatively lengthy. For example, if the MSU 101 is on the top of a relatively tall building (having in excess of 40 floors) and the RU 103 is located on the lowest floor, then the wire line 105 between the MSU 101 and the RU 103 can be as long as several hundred meters.

In at least some instances, the MSU 101 and the RU 103 each have active amplifiers that provide gain to amplify the signals transmitted between the MSU 101 and the RU 103 to compensate for the losses that occur due to the length of the wire line 105. Due to the length of the wire line 105, changes may occur in the loss imposed on the signal as the signal traverses the wire line 105. These changes are due in part to temperature and changes over time due to aging of the wire line 105. Similar to the passive loss imposed by the wire line 105, the active gain provided by the amplifiers within the MSU 101 and the RU 103 can change due to both temperature and aging. It should be understood that these are typically relatively long term effects. That is, the temperature of the wire line 105 through a building will typically not change very rapidly. Similarly, the changes in the temperature of the MSU 101 and the RU 103 will occur relatively slowly (i.e., a couple of degrees per minute at the fastest, and more typically a couple of degrees per hour).

In order to compensate for these changes, initial measurements are made of the power levels at particular points in the circuit. These measurements are then used to calculate a reference gain in the system 100. It will be understood that a loss is herein referred to as a negative gain. Therefore, in all of the following discussions, the term gain will be used to refer to both gains and losses. Once a reference gain is determined for the system 100, or some portion of the system 100, then operation gain measurements are made and compared to the reference gain in order to calculate a gain adjustment value (i.e., an amount that the active components in the system 100 should be adjusted to compensate for any changes to the total gain of the system 100). A control signal is generated based upon the comparison. The control signal operates to maintain the operational gain of the system within a predetermined range of the reference gain.

Detectors, including an MSU input detector 107, an MSU output detector 109, RU input detector 111, and an RU output detector 113 provide a means by which to measure the instantaneous power at particular points in the system 100. It should be understood that there are many way in which one skilled in the art would know to make power measurements. It should also be understood that only two of the detectors shown in FIG. 1 are required to implement the presently disclosed method and apparatus. For example, in one embodiment of the method and apparatus, all that are required are the MSU detector 107 and the RU output detector 113. In another embodiment, the MSU detector 107 and the RU input detector are all that is required. It can be seen that the particular detectors that are used will determine which parts of the system 100 can be monitored and for which parts of the system 100 the method and apparatus can compensate for changes in the gain. It should also be understood that the configuration shown in FIG. 1 assumes that the path in question is the "forward link" path. The forward link path is the path from the base station to the mobile station. However, the same concepts apply to the reverse link path from the mobile station to the base station. In that case, the input and output of the system 100 would be reversed so that signals are received first by the RU 103 and then relayed to the MSU 103 and output from the MSU 103 to a base station.

While this disclosure predominantly discusses measuring instantaneous power levels and doing calculations to determine average power (i.e., "filtering" the measurements), it will be understood that detectors that detect average power over time may also be used to implement the disclosed method and apparatus.

Figure 2:
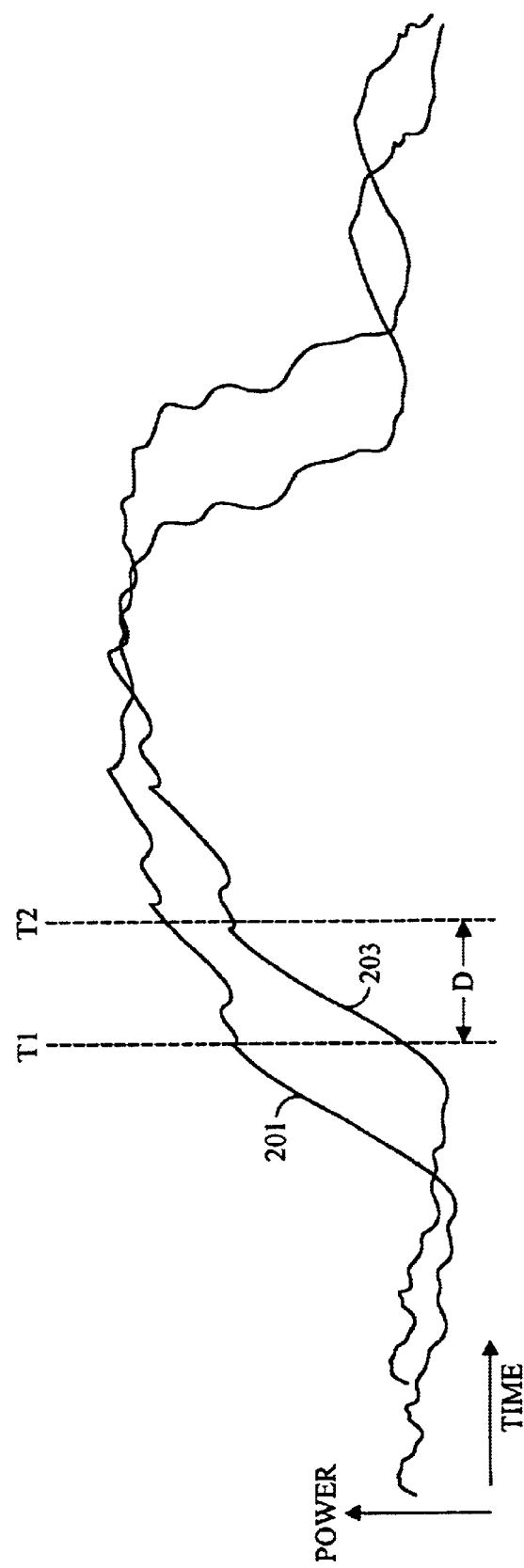
FIG. 2 shows a first curve representing the instantaneous power at the input to the MSU and a second curve representing the instantaneous power at the output from the RU over a period of time.

In at least some circumstances, it can be assumed that there will be a relatively substantial delay in the signal measured at the input detector 107 and the output detector 113. If the delay from a first point at which power is being measured to a second point at which power is being measured is significant with respect to the amount of time over which the power measurements are being made, then special considerations have to be made in order to correlate the measurements being made at the different detectors 107, 109, 111, 113. For example, FIG. 2 shows a first curve 201 representing the instantaneous power at the input to the MSU 101 and a second curve 203 representing the instantaneous power at the output from the RU 103 over a period of time. At a first time, T1, the instantaneous power at the input to the MSU 101 is much higher than the instantaneous power at the output to the RU 103. It should be noted that the instantaneous power at the input of the MSU 101 at time, T1 (as seen on curve 201) is essentially the same as the instantaneous power at the output of the RU 103 at time, T2 (as seen on curve 203) since there is a delay of approximately "D" as shown in FIG. 2.

Since the measurements being made at the MSU 101 are remote from the measurements being made at the RU 103, there is a need to synchronize a clock in the RU 103 with a clock in the MSU 101 and use these synchronized clocks to note the time at which measurements are made at each point. If the time at which the measurements are made is known, then measurements made at the MSU 101 can be correlated with measurements made at the RU 103 in order to ensure that the delay between the two units 101, 103 is taken into account. That is, comparing power measurements taken at the input to the MSU 101 at a time "t1" with measurements taken at the output of the RU 103 a time equal to t1+D, where D is the amount of delay between the input to the MSU 101 and the output from the RU 103. Accordingly, the input and output power measurements are "time correlated".

One way to reduce the effects of the delay between the MSU 101 and the RU 103 is to make the amount of time over which the power is measured far greater than the rate of change of the signals being measured. By doing so, the average power is compared instead of the instantaneous power. It can be seen from FIG. 2 that if the average power is calculated over the entire time shown in FIG. 2, the total amount of power received by the MSU 101 and the total amount of power transmitted by the RU 103 will be essentially equal. There will still be a small difference between the two total power measurements, depending upon the rate of change in the instantaneous power in the signals and the difference at the beginning and end of the measurement periods, but in general, the longer the measurement period, the smaller the effect of any instantaneous changes in the power of the signals.

The process of taking multiple measurements in order to reduce the influence of any one instantaneous measurement is generally referred to herein as "filtering". However, it should be understood that this term applies to any means by which the values of several measurements are reduced to a single value for the purpose of reducing the influence of individual measurements when there is a difference in the values of the several measurements.

In accordance with one embodiment of the disclosed method and apparatus, power measurements are taken at both the input detector 107 and output detector 113 at regular intervals. All of the measurements from the input detector 107 are summed until a predetermined number, n, of measurements have been taken, such as 1024. As each of the predetermined number, n, of measurements is taken, an input power value is calculated by multiplying n−1 times the most recent input power value plus the most recent measurement at the input detector 107. The sum is then divided by n to generate a new input power value. Thus:

$$IPV = ((IPV*1023) + IDV)/1024 \qquad \text{EQ. 1}$$

where IPV is the input power value and IDV is the input detector value.

Similarly, n measurements are made at the output detector 113, to determine the output power value. As noted above, the time at which these measurements were taken may be recorded in order to correlate each input power value with a corresponding output power value to account for the delay between the input detector 107 and the output detector 113. It will be understood by those skilled in the art that this technique for filtering the measurements is just one of a number of techniques that could be used. Furthermore, the disclosed method and apparatus may operate without any filtering at all. Examples of alternatives to the filtering technique described above include simple averaging over non-overlapping periods of time, rolling averages, elimination of the high and low values, etc.

Once an input power value at the input detector 107 is determined and at the output power value at the output detector 113 is determined, then a gain value is calculated from the difference of the input power value minus the output power value. The gain value is provided to a processor 102 within the RU 103. The processor 102 within the RU 103 generates a control signal in response to the gain value. The control signal provides a means by which the gain of the system 100 can be altered, such as by reducing or increasing the gain of a controllable gain device, such as active amplifiers in the RU 103. The gain value is preferably calculated at the RU 103, since several RUs are coupled to an MSU in a typical system configuration.

Figure 3:
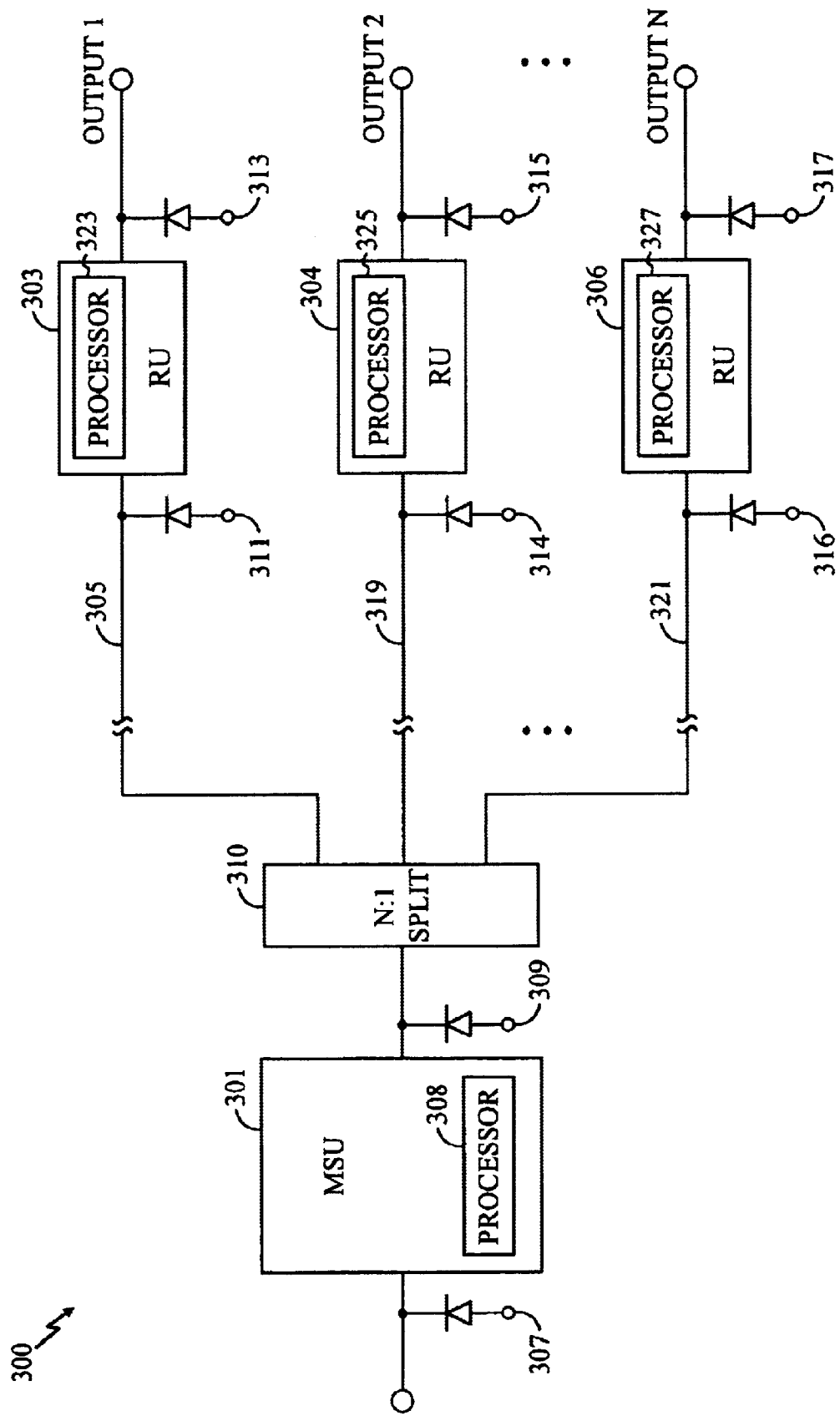
FIG. 3 is an illustration of the forward link of such a system in which several RUs share an MSU.

FIG. 3 is an illustration of the forward link of such a system 300 in which several RUs 303 share an MSU 301. The gain between the MSU 301 and each of the RUs 303, 304, 306 is typically different, since there is typically a different length of cable 305, 319, 321 between each RU 303, 304, 306 and the MSU 301. Furthermore, each RU 303, 304, 306 has an amplifier (not shown in FIG. 3) that amplifies only the signals that are received from the MSU 301 by that RU 303, 304, 306. Accordingly, FIG. 3 illustrates three distinct paths: a first path from the input of the MSU 301 to the output of RU 323; a second path from the input of the MSU 301 to output of RU 325; and a third from the input of the MSU 301 to the output of RU 327.

The MSU 301 is common to all of the RUs 303, 304, 306. Therefore, any adjustment made in the MSU 301 to the gain would affect the outputs of all the RUs 303, 304, 306. Accordingly, any adjustments to the system gain for a particular output are preferably made in each individual RU 303, 304, 306. By calculating the gain at the RUs 303, 304, 306, the gain for each path is calculated in the associated RU 303, 304, 306. The gain for that path can be adjusted by controlling the gain of amplifiers or other circuits in the associated RU 303, 304, 306. However, it is also possible to calculate the gain in the MSU 301 and return the gain value or a control signal to the RUs 303, 304, 306.

In one embodiment of the disclosed method and apparatus, the control signal represents the difference between the operational gain in a path and the desired gain for that path. Alternatively, the operational gain of each path is compared to a reference gain value associated with each path. Control signals associated with each path are generated for the purpose of commanding gain elements to increase or decrease the gain of the path. The goal of the control signal is to maintain the path gain within a predetermined range of the reference gain determined for that path. The reference gain value is determined during an initialization process. In one embodiment, the processor 323, 325, determines the reference gain value 327 within the RU 303, 304, 306.

Alternatively, the information necessary to determine the reference value may be communicated to a processor anywhere in the system. It should be noted that the processor 323, 325, 327 may be implemented in any circuit or programmable device that is capable of performing the determination, such as a state machine, microprocessor, application specific integrated circuit (ASIC), dedicated hardware, etc.

In accordance with one embodiment of the disclosed method and apparatus, an initialization process takes place prior to the system 300 being put into service (i.e., becoming operational). A signal is injected into the system at the input to the MSU 301 in a manner that allows the MSU input detector 307 to read the signal power of the injected signal. The signal follows the path from the MSU 301 to each of the RUs 303, 304, 306. The detectors at each RU 303, 304, 306 detect the amount of power in the signal that is output from each RU 303, 304, 306, respectively. A gain value is then calculated for the path through each RU 303, 304, 306. The gain values associated with each path are stored as reference gain values. The injected signal is then removed and the system placed into service (i.e., made operational). Accordingly, signals are input to the MSU 301 from base stations in the area.

In embodiments in which there are a predetermined number of power measurements that must be made before the power level at each point can be determined, the injected signal is applied until the predetermined number of measurements have been made. For example, in one system 300, 1024 samples of the power are taken at the input detector 307 and the output detector 313 before a power level can be determined at the input detector 307 and the output detector 313. As the 1024 samples of the power have are being taken at both the input detector 307 and the output detector 313, the input power level and the output power level are each determined by EQ. 1 above. The input power value is then communicated to each RU 303, 304, 306. Any means for communicating the input power value to the RUs 303, 304, 306 can be used.

Concurrent with the calculation of the input power value, each RU 303, 304, 306 calculates an output power level associated with the path through that particular RU 303, 304, 306. The output power values are calculated essentially the same way as the input power values. That is, the detector at the output of each RU 303, 304, 306 detects 1024 samples of the power level at the output of the RU 303, 304, 306 once service has begun in the system 300. Equation EQ. 1 is applied to generate an output power value after each power level is sampled. Both the input power value and the output power value are updated at the sample rate by recalculating the new value in accordance with EQ. 1.

Once an RU 303, 304, 306 receives the input power value from the MSU 301, the RU 303, 304, 306 subtracts the output power value from the received input power value. It should be noted that in systems 300 in which the delay between the input detector 307 and the output detector 313 is taken into account, the input and output power values are time correlated, as noted above.

By calculating the control signal from the difference between the reference gain value and an operational gain value, the operational gain value can be calibrated on an ongoing basis to correct for any variations due to temperature changes, aging, etc. It should be understood that since the reference gain value is taken from an actual measure of the gain of the system 300 during an initialization under controlled conditions, the gain of the system could be accurately controlled to maintain stability.

The systems 100, 300 of FIGS. 1 and 3 show detectors at both the input and the output of the MSU 101, 301 and at the input and output of the RU 103, 303. The placement of these detectors is to illustrate that the gain associated with the MSU 101, 301 and the RU 103, 303 can either be taken into account, or not, depending upon which detectors are provided (or depending upon which detectors are read if all detectors are provided). That is, if the gain of the MSU 101, 301 is to be taken into account, then the input detector 107, 307 should be used to determine the input power value. However, if the gain of the MSU 101, 301 is not to be taken into account, then the detector 109, 309 should be used to determine the input power value.

Likewise, the gain of the RU 103, 303 can either be taken into account or not by using either the detectors on the input 111, 311, 314, 316 or the output 113, 313, 315, 317 of each RU 103, 303. Depending upon conditions, such as the placement of power splitters in the system, whether power levels at particular points are sufficiently high to be detected, and other considerations, it may be desirable not to attempt to determine the gain of the MSU 101, 301. Similarly, it may not be desirable to attempt to determine the gain of the RU 103, 303. Accordingly, in FIG. 1, any combination of input detectors 107, 109 and output detectors 111, 113 can be used, including all of the detectors to provide maximum flexibility in determining whether to include the gain of the MSU 101 and the RU 103 in the gain value determination. Likewise, in FIG. 3, any combination of input detectors 307, 309 and output detectors 311, 313 and 314, 315, and 316, 317 can be used depending upon whether the gain of the MSU 301 and the RU 303 is to be taken into account.

One instance in which the gain of the MSU 101, 301 should not be taken into account is when the input to the MSU 101, 301 is too small (the power is too low) to be detected. For example, the gain at the input to the MSU 101, 301 may be too low to detect if processing gain is used to recover intelligence from a signal in which the signal to noise ratio is low.

Code Division Multiple Access systems are an example of systems in which the processing gain makes it possible to receive signals that are not detectable without demodulation and signal processing. In at least some embodiments of the disclosed method and apparatus, simple power detectors are used that do not have processing gain. In such cases, the gain of the MSU 101, 301 cannot be taken into account, since the ratio of the input to output values is unknown, since the level of the input signal is essentially unknowable without sophisticated signal processing. Therefore, the input detectors 107, 307 at the output of the MSU 101, 301 are used. It should be noted that in an alternative embodiment of the disclosed method and apparatus, processing gain might be used in the detectors to determine the signal levels when the signals are too weak for detection without such processing gain.

In one embodiment, a processor 104, 308 (within the MSU 101, 301 for example) can determine whether the gain of the MSU 101, 301 should be taken into account. The processor 104 may be implemented in any circuit or programmable device that is capable of performing the calculation, such as a state machine, microprocessor, application specific integrated circuit (ASIC), dedicated hardware, etc.

If the input signal is above a predetermined threshold, then the gain of the MSU 101, 301 is taken into account. However, if the input signal is not above the predetermined threshold, then the gain of the MSU is not taken into account. In the case in which the input detectors change depending upon the level of the signal being received at the input to the MSU 101, 301, the reference gain value is calculated using both input detectors 107, 307 and 109, 309.

The above discussion relates to the forward link (signals received by the MSU 101, 301 from a base station and transmitted to a mobile station through the RU 103, 303). In the case of the reverse link (signals received by the RU 103, 303 from a mobile station and transmitted to a base station through the MSU 101, 301) in which more than one RU 103, 303 is coupled to one MSU 101, 301, the situation is substantially different. This is due to signals from multiple RUs being combined.

Figure 4:
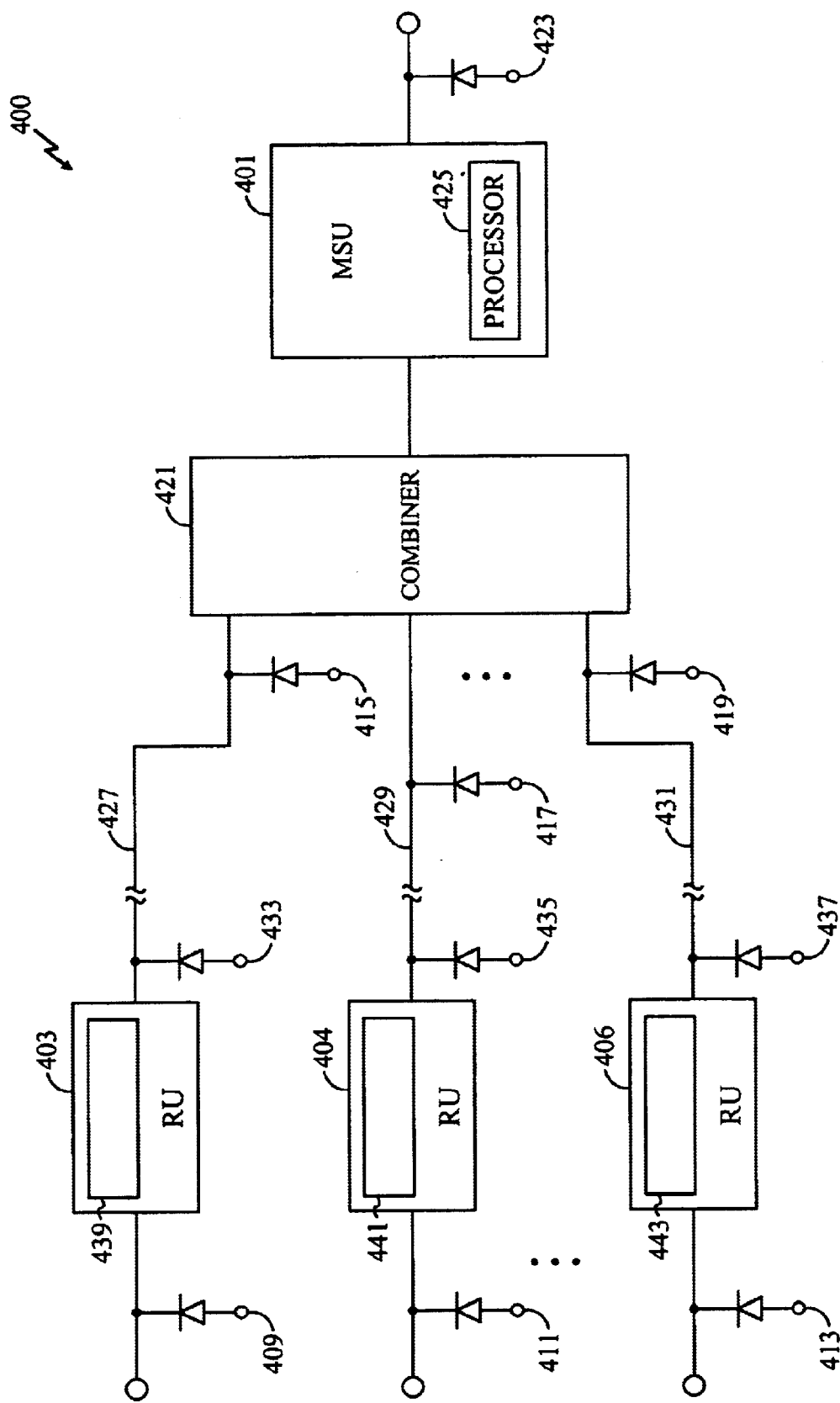
FIG. 4 is an illustration of a reverse link configuration in which multiple RUs are coupled to a single MSU.

FIG. 4 is an illustration of a reverse link configuration in which multiple RUs 403 are coupled to a single MSU 401. In the system 400 of FIG. 4, there are a plurality of RUs 403, 404, 406, each associated with an input detector 409, 411, 413, respectively. The outputs from each of the RUs 403, 404, 406 are coupled to an input end of a relatively long wire line 427, 429, 431, each RU 403, 404, 406 being coupled to one of the wire lines 427, 429, 431 in a one to one relationship. The output end of each wire line 427, 429, 431 is coupled to a combiner 421 and combined into a single output.

An alternative embodiment of the disclosed method and apparatus could be configured to have more than a single output. Nonetheless, the output from the combiner 421 is coupled to the input to the MSU 401. As users apply signals to each RU 403, 404, 406, the signals are summed in the combiner 421. Since it is typical for each RU 403, 404, 406 to service a different physical space, signals that are received by one RU will typically not be received by any other RU. Once the combiner 421 combines the signals, there is no way to determine how much power is due to each individual RU. This poses a substantial problem to the process of determining the gain value for the reverse link of this system 400.

However, in accordance with the disclosed method and apparatus, the gain value can be determined if the values of the signals at the output from the RUs is known or can be reasonably accurately determined. If the relative power level at the output from one of the RUs 403 is substantially higher than the relative power level at the output of all of the other RUs 404, 406, then the gain of the path that includes the "dominant" RU 403 can be determined. This is true because the contribution of the output power from the other RUs 404, 406 is negligible and can be ignored without too great an error in the overall gain estimate for the path that includes the dominant RU 403.

Therefore, in the reverse link system 400, the values of each of the RU input detectors 409, 411, 413 are communicated to a processor, such as a processor 425 within the MSU 401. It should be noted that the processor 102 may be implemented in any circuit or programmable device that is capable of performing the calculation, such as a state machine, microprocessor, application specific integrated circuit (ASIC), dedicated hardware, etc. Once received in the processor 425, the processor 425 determines whether the output signals from one of the RUs 403, 404, 406 will be sufficiently dominant to make an estimate of the gain value sufficiently accurate. The determination as to what is "sufficient" will depend upon the nature of the system and the accuracy with which the system designer wished to control the gain of the system 400.

In accordance with one embodiment, calibration is performed by injecting a signal into the system at the input to one RU 403, 404, 406 at a time and subtracting the output value (i.e., the value determined at an output detector 423) from the input value (i.e., the value determined at the detector 409, 411, 413 associated with the particular RU into which the injected signal has been applied. The input and output values may be determined either with or without using a filtering technique and/or time correlation.

Alternatively, or additionally, the gain of each wire line 427, 429, 431 can be determined using a detector at each end of the wire line. Assuming the signals at the input to the RUs 403, 404, 406 are strong enough to be detected by the detectors 409, 411, 413, the difference between the values determined at the detectors 415, 417, 419 can be subtracted from the values determined at the detectors 409, 411, 413. It should be understood that the values at the detectors 409, 411, 413, 415, 417, 419 might be determined by the use of a filtering process, such as described above. Alternatively, the values may be determined directly from the detected values.

Furthermore, the inputs may be determined at the detectors 409, 411, 413 if the signal levels detected there are powerful enough to be detected, as may be determined by the signals at either the input or output of the RUs 403, 404, 406 being above a threshold power level. Alternatively, each RU 403, 404, 406 may select to detect the values at the output of the RUs 403, 404, 406 if the values detected at either the input or output of the RUs 403, 404, 406 are below a predetermined threshold. This determination may be made by a processor 439, 441, 443 within the RU 403, 405, 306 in the path for which the measurements are being made, or alternatively by the processor 425 in the MSU 401. In yet another embodiment, a stand-alone processor performs the processing and control of the calibration procedure (not shown). It should be noted that the processors 425, 439, 441, 443 may be implemented in any circuit or programmable device that is capable of performing the calculation, such as a state machine, microprocessor, application specific integrated circuit (ASIC), dedicated hardware, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A remote unit for use in a communication system, the remote unit comprising:

a) a measurement means for providing a measurement of the amount of power that is being output by the remote unit;

b) a receiving means for receiving a value indicative of the amount of power received by a master system unit from a base station;

c) a processing means, coupled to the measurement means and to the receiving means, for calculating the difference between the measurement and the received value and further for providing a control signal in response to the calculated difference; and d) a filter means, coupled to the measurement means, for filtering the measurement of the amount of power that is being output by the remote unit and providing a filtered measurement, wherein the filter means filters by multiplying a current value of the filtered measurements by n minus 1, adding the most recent unfiltered measurement, and dividing the sum by n.

2. A remote unit for use in a communication system, the remote unit comprising:

a) a measurement means for providing a measurement of the amount of power that is being output by the remote unit;

b) a receiving means for receiving a value indicative of the amount of power received by a master system unit from a base station; and c) a processing means, coupled to the measurement means and to the receiving means, for calculating the difference between the measurement and the received value and further for providing a control signal in response to the calculated difference;

d) a filter means, coupled to the measurement means, for filtering the measurement of the amount of power that is being output by the remote unit and providing a filtered measurement; and a receiving n system unit when the received value indicative of the amount of power received by the master system unit is less than a predetermined value.

3. A method for performing ongoing calibration on a communication system that has a remote unit and a master system unit, including:

a) injecting a signal into the master system unit b) determining the power level of the injected signal at the input to the master system unit;

c) determining the power level of the injected signal at the output of the remote unit;

d) subtracting the power level at the input of the master system unit from the power level at the output of the remote unit to determine a reference gain;

e) removing the injected signals;

f) placing the communication system in service;

g) determining the power level at the input to the master system unit;

h) determining the power level at the output of the remote unit;

i) subtracting the power level at the input of the master system unit from the power level at the output of the remote unit to determine an operational gain;

j) determining the difference between the reference gain and the operational gain; and k) adjusting the operational gain in response to the difference between the reference gain and the operational gain.

4. The method of claim 3, further including:

a) determining whether the input to the master system unit is above a predetermined threshold; and b) if the master system unit is not above the predetermined threshold, then performing step g) by determining the power level at the output of the master system unit instead of at the input of the master system unit and subtracting the power level of the output of the master system unit from the power level at the output of the remote unit to determine the operation gain.

5. The method of claim 4, further including:

a) time correlating the power determination at the output of the master system with the determination of the output power at the output of the remote unit.

6. The method of claim 3, further including:

a) time correlating the power determination at the input to the master system with the determination of the output power at the output of the remote unit.

7. A method for performing ongoing calibration on a communication system that has a plurality of remote units and a master system unit, including:

a) determining a power level at an input to each of the plurality of remote units;

b) determining whether the input level at one of the plurality of remote units is significantly greater than the input level at each of the other remote units;

c) if so, then determining the power level at the output of the remote unit;

d) subtracting the power level at the input of the remote unit having the highest power level from the power level at the output of the master system unit to determine an operational gain.

8. The method of claim 7, further including:

a) time correlating the power level at the output of the master system unit with the power level determined at the input to the one remote unit having a significantly higher input level then the power levels at the inputs to the other remote units.

9. The method of claim 7, further including:

a) injecting a signal into the input of at least one of the remote units;

b) determining the power level at the output of the master system unit;

c) subtracting the power level at the input of each remote unit having had the signal injected, from the power level at the output of the master system unit to determine a reference gain;

d) comparing the operational gain with the reference gain;

b) generating a control signal in response to the comparison.

10. The method of claim 9, further including:

a) applying the control signal to a controllable gain device in order to adjust the operational gain.

\* \* \* \* \*